United States Patent [19]

Meyer

[11] Patent Number: 4,674,577

[45] Date of Patent: Jun. 23, 1987

[54] TURF HARVESTER

[76] Inventor: John L. Meyer, P.O. Box 1312, Ennis, Tex. 75119

[21] Appl. No.: 756,803

[22] Filed: Jul. 19, 1985

[51] Int. Cl.4 .......................... A01B 45/04; G05G 1/04
[52] U.S. Cl. ........................................... 172/20; 74/522
[58] Field of Search ......................... 172/19, 20, 40, 84, 172/89; 74/522

[56] References Cited

U.S. PATENT DOCUMENTS

| | | | |
|---|---|---|---|
| 357,536 | 2/1887 | Pryor | 172/89 |
| 585,484 | 6/1897 | Shafer | 172/84 X |
| 2,740,211 | 4/1956 | Henry et al. | 172/19 X |
| 3,357,499 | 12/1967 | Finneyfrock | 172/19 |
| 3,509,944 | 6/1966 | Brouwer et al. | 172/20 |
| 3,807,504 | 4/1974 | Nunes, Jr. | 172/20 |
| 4,029,152 | 6/1977 | Gerrits | 172/19 |

Primary Examiner—Richard T. Stouffer
Assistant Examiner—Terrence L. B. Brown
Attorney, Agent, or Firm—Charles S. Cotropia

[57] ABSTRACT

A turf harvester cutter assembly includes a blade assembly attached adjacent one end of a pair of parallel blade carrying arms. Structure is provided for reciprocating the blade carrying arms at input points opposite the pivot points from the blade assembly to effect cutting by the blade assembly. The blade assembly, pivot points and reciprocation input points are substantially aligned.

15 Claims, 6 Drawing Figures

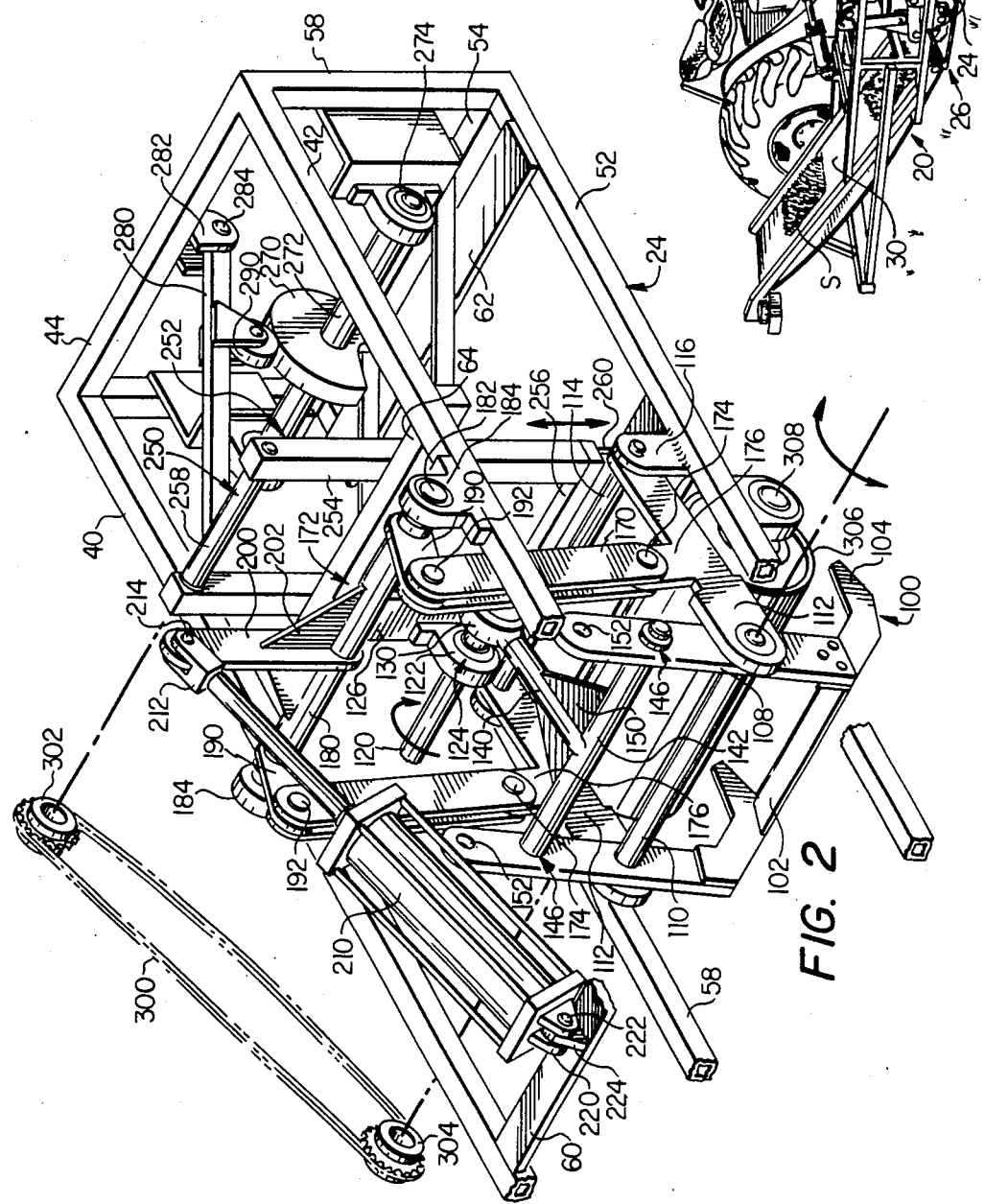

TURF HARVESTER

TECHNICAL FIELD

The present invention relates to a turf harvester and, more specifically, to a reciprocating blade turf harvester providing for blade height, stroke and pitch adjustment.

BACKGROUND ART

Previous turf harvesting devices have generally been of the type for attachment to tractors and provide for a reciprocating blade which is moved in an arc to undercut sod thereby harvesting turf in strips of the width defined by the blade. Although these prior devices provide for means of adjustment of blade height and blade pitch, their structures have been ineffective in providing accurate and simple control while providing a structure which is durable and substantially maintenance free.

Examples of prior turf cutting devices are shown in U.S. Pat. No. 3,357,499, to D. W. Finneyfrock; U.S. Pat. No. 4,029,152 to Theodorus Gerrits; and U.S. Pat. No. 3,807,504, to John Nunes, Jr. These references provide various structures for turf harvesting but fail to provide a design which is both straightforward and structurally sound without requiring over design of the components necessary for providing a reciprocating cutting action for undercutting sod. In particular, the references fail to provide a design which permits change of the stroke length and pitch of the cutting blade while also permitting vertical adjustment of the blade with ease. In the Finneyfrock reference, blade pitch adjustments are made without adjustment to blade stroke. The pivot point of the assembly for carrying the blade is off axis from a line between the blade and the point of attachment of the reciprocating load input to the assembly.

The designs in the structures of the patents to Gerrits and to Nunes, Jr. also provide designs which do not lend themselves to ready adjustment of blade height, stroke and pitch. For example, in the Geritspatent, height adjustment is limited by that provided by eccentric discs positioned at the upper end of the blade carrying arm. Further, the reciprocation force is input into the blade assembly intermediate of the blade and its point of rotation.

Thus, a need has arisen for an improved turf harvester which provides a structure permitting adjustment of blade height, pitch and stroke which is both simple in its arrangement and structurally sound without requiring over design of components making up the structure.

DISCLOSURE OF THE INVENTION

The present invention provides a turf harvester which overcomes many of the limitations found in the prior art harvesters. In one embodiment of the invention, the harvester includes a cutter assembly comprising blade carrying arms with a blade assembly attached at one end of the carrying arms. Trailing arms support the blade carrying arms at pivot points adjacent one end thereof. Frame structure is provided for pivotally supporting the trailing arms and for imparting reciprocating movement to the blade carrying arms at input points opposite the pivot points from the blade assembly. This reciprocation means imparts a reciprocating movement to the blade to effect cutting. The blade assembly, pivot point and reciprocation input points are substantially aligned in a common plane.

A blade height adjustment is provided for selectively raising and lowering the trailing arms to raise and lower the blade. Blade stroke and pitch are adjusted by providing alternate input points on the blade carrying arms for receiving the reciprocating movement structure. These alternate input points are provided at different positions from the pivot point and are substantially in alignment with the blade assembly and pivot points.

In a further embodiment of the invention, the blade height adjustment comprises a bell crank connected to the trailing arms by way of coupler arms. Structure is provided for rotating the bell crank to raise or lower the trailing arms and thereby raise or lower the blade assembly. In a preferred embodiment of the invention, the structure for rotating the bell crank includes a hydraulic cylinder connected between the frame and the bell crank.

In another embodiment of the application of the invention, a turf harvester cutter assembly includes parallel carrying arms having a blade assembly attached at one end of the carrying arms. Structure is provided for supporting the blade carrying arms at a pivot point. Structure is also provided for reciprocating the blade carrying arms through the attachment of a reciprocating arm to the blade carrying arms opposite the pivot point from the blade assembly. The blade, pivot point and point of attachment of the reciprocating arm are substantially in a common plane through the blade carrying arms.

A blade stroke and pitch adjustment is provided including means for attaching the reciprocating movement means at one of a plurality of positions substantially in alignment with the blade assembly and pivot points of the blade carrying arms. Blade height adjustments are provided by structure permitting movement of the blade carrying arms relative to a frame for supporting blade elevation means designed to raise and lower the blade carrying arms. In one embodiment, this blade elevation structure includes a bell crank moved by a hydraulic cylinder and attached by way of a coupling arm to the blade assembly. In one embodiment, said bell crank is moved by a hydraulic cylinder. In an alternative embodiment, said bell crank is moved manually and locked in place relative to the frame after adjustment.

BRIEF DESCRIPTION OF THE DRAWINGS

For a more complete understanding of the present invention, and for further details and advantages thereof, reference is now made to the following Detailed Description taken in conjunction with the accompanying Drawings, in which:

FIG. 1 is a perspective view of the turf harvester of the present invention shown attached to a tractor;

FIG. 2 is a perspective view of the turf harvester shown in FIG. 1, showing the harvester removed from the tractor;

DETAILED DESCRIPTION

Figure 3:
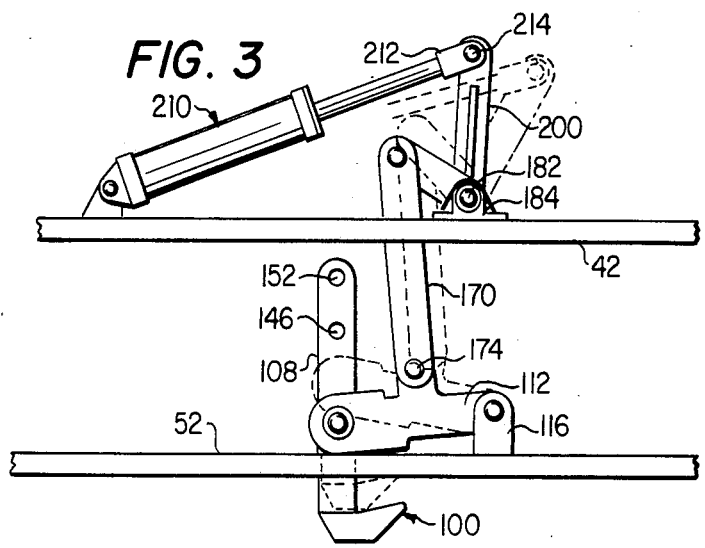
FIG. 3 is a side elevation view showing the harvester blade assembly in solid lines in its lower position and in phantom lines in a raised position.

FIG. 1 illustrates a perspective view of a turf harvester 20 attached in a side position to a tractor 22. Turf harvester 20 includes a frame 24 with a cutter assembly 26 supported therein for cutting strips of sod 5 in predetermined lengths for delivery to a conveyor system 30. FIG. 1 also shows a safety screen frame 32 supported from frame 24. Safety screen frame 32 normally will carry a safety screen to prevent accidental engagement with the mechanism of cutter assembly 26. FIG. 1 is shown with the safety screen removed for purposes of clarity of illustration.

Reference is made to FIG. 1 in conjunction with FIG. 2, wherein cutter assembly 26 is shown in greater detail. Frame 24 is a cage type integrated structure having upper horizontal tube members 40 and 42 joined by an end top member 44. This structure is connected to lower tube members 50 and 52 and end tube 54, by vertical tubes 56 and 58. Frame 24 is supported by an upper and lower cross member plate 60 and 62, respectively, and a lateral support tube 64.

Cutter assembly 26 includes a blade assembly 100 having a blade 102 supported between end plates 104. Blade assembly 100 is supported at one end from a pair of parallel blade carrying arms 108. Arms 108 are pivotally supported on a pivot shaft 110 which extends through arms 108 and are journaled in the end of a pair of trailing arms 112. Trailing arms 112 are in turn pivotally supported on a pivot shaft 114 which extends through trailing arms 112 and are journaled in lugs 116 extending upwardly from frame lower tube members 50 and 52.

An oscillating motion is imparted to blade assembly 100 by the rotation of an input shaft 120 supported by an appropriate bearing 122 in pillow block 124 attached to an extension 126. An eccentric 130 is mounted on the end of input shaft 120 and drives a fitting 132 rotating therewith. Fitting 132 is connected by a tube 140 to a cross shaft 142 which is attached at its ends through apertures 146 in blade carrying arms 108. Appropriate attachment means is provided at this point of attachment. Gusset supports 150 are mounted between shaft 142 and tube 140 to add support at the point of attachment.

As can be seen in FIG. 2, apertures 152 are formed in blade carrying arms 108, at a greater distance from pivot shaft 110 than apertures 146. By relocating the attachment of pivot shaft 110 to apertures 152, the stroke of blade assembly 100 is shortened and the pitch of the blade reduced, as will be discussed hereinafter in greater detail.

The height of blade assembly 100 relative to frame 24 is adjusted by raising and lowering trailing arms 112. Trailing arms 112 are connected by coupler arms 170 to a bell crank assembly 172. At their lower ends, coupler arms 170 are connected by pivot pins 174 to upstanding lugs 176 extending from trailing arms 112. Bell crank 172 includes a main shaft 180 with its ends journaled in bearings 182 housed in pillow blocks 184 mounted on frame upper horizontal tube members 40 and 42. Bell crank arms 190 extend from shaft 180 and are attached by pins 192 to coupler arms 170. An extension plate 200 extends from shaft 180 and is supported relative thereto by gusset plates 202. A hydraulic cylinder 210 is attached between frame plate 60 and the end of extension plate 200 remote from shaft 180. Attachment of hydraulic cylinder 210 to extension plate 200 is by way of an appropriate U shaped fitting 212 and pin 214. Attachment of cylinder 210 to frame plate 60 is by way of extension 220 and pin 222 for engagement through an upstanding lug 224 mounted on frame plate 60.

Referring still to FIG. 2, a chop off mechanism 250 is incorporated in the system for cutting the sod into predetermined lengths. Chop off mechanism 250 includes a cutoff frame assembly 252 having vertical arms 254 spaced by lower and upper members 256 and 258, respectively. A cutoff blade 260 is supported below lower member 256. Cutoff assembly 252 is biased downwardly by an appropriate means, such as a spring (not shown). A chop off wheel 270 is supported for rotation on a shaft 272 journaled on each end by an appropriate pillow block to vertical frame vertical tubes 56 and 58. A follower shaft 280 is pivotally attached at ears 282 by way of pin 284 to frame end top member 44 with its opposite end attached to upper cross member 258. Cross member 258 is pivotally received at its ends in vertical chop off frame arm 254. A follower 290 is supported below follower shaft 280 and is biased against chop off wheel 270. Shaft 272 and chop off wheel 270 are driven by chain and sprocket assembly 300 and 302, chain 300 being driven in response to the rotation of sprocket 304. Sprocket 304 is driven in response to the rotation of ground engaging roller 306 supported for rotation on a shaft journaled in appropriate pillow blocks and bearing assemblies 310. Pillow block and bearing assemblies 310 are supported below frame lower tube members 50 and 52.

Figure 4A:
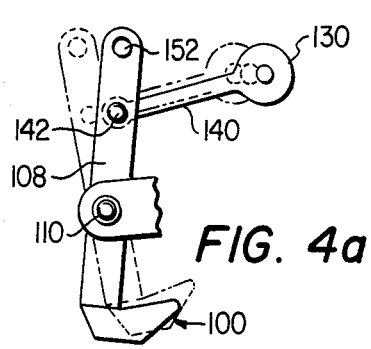
FIGS. 4a and 4b are side elevation views showing the movement of the blade assembly with the reciprocating structure attached at the maximum stroke, maximum pitch position (FIG. 4a) and in the minimum stroke and minimum pitch position (FIG. 4b)
Figure 4B:
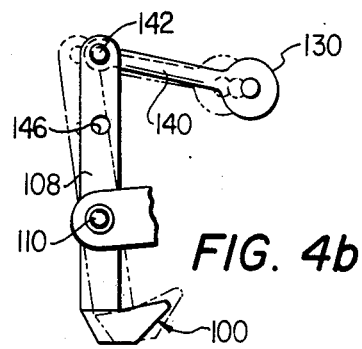

The reciprocating motion imparted to blade assembly 100 is shown in FIGS. 4a and 4b. Specifically, as eccentric 130 rotates, tube 140 reciprocates to impart a rocking motion to blade carrying arms 108 about pivot shaft 110. This in turn imparts a reciprocating motion to blade assembly 100.

As is shown in FIG. 4b, the pitch and stroke of blade assembly 100 may be adjusted, simultaneously, by moving the point of attachment of pivot cross 142 from apertures 146 to apertures 152. With this simple adjustment, the pitch of blade assembly 100 is reduced, as is the stroke length.

The height adjustment of blade assembly 100 is illustrated in FIG. 3. By extending hydraulic cylinder 210, bell crank 172 is rotated to elevate coupler arms 170 and in turn raise trailing arms 112, blade carrying arms 108 and blade assembly 100. By retracting hydraulic cylinder 210, the blade assembly is lowered. Any intermediate position can also be achieved for blade assembly 100 by merely extending or retracting hydraulic cylinder 210.

Figure 5:
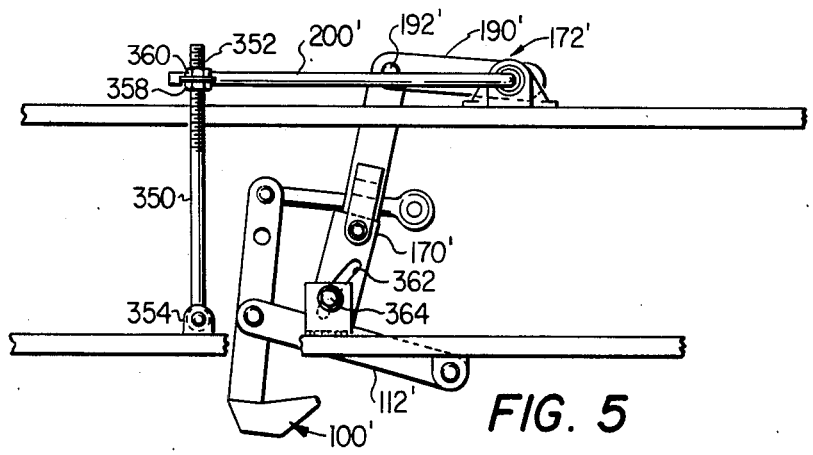
FIG. 5 is a side view of an alternative form of the cutter assembly of the present invention.

FIG. 5 illustrates an alternative form of the present invention wherein the adjustment of the height of blade assembly 100 is manual rather than by use of a hydraulic cylinder.

Some of the components of the structure disclosed in the embodiment of FIG. 5 correspond to components of the embodiment of FIGS. 1 through 4. To facilitate the description of the embodiment of FIG. 5, like or similar components to those in the embodiment of FIGS. 1 through 4 are designated by the same number but with the addition of the prime (') notation In this arrangement of the invention, coupler arms 170' are attached to trailing arms 112'. The upper end of coupler arms 170' are attached to a bell crank 172'. Bell crank 172' has a pair of arms 190' extending from a main shaft and attached at pivot pin 192' to coupler arms 170'. Bell crank 172' also has a pair of extension arms 200' which are supported at their end from frame member 52' by a shaft 350 having a threaded end 352. The lower end of each shaft 350 is journaled in an extension 354 extending from frame member 52'. The upper end is received in an extension 356 attached to arm 200' and adjustment is provided by nuts 358 and 360. By moving nuts 358 and 360 upwardly on the threaded end of shaft 350, arm 200' is raised thereby rotating bell crank 172' in a clockwise position as shown in FIG. 5. This in turn raises the associated structure and blade assembly 100'. An arcuate slot 362 is formed in coupler arms 170', and a bolt 364 is received through an upstanding plate 366 attached to frame member 52' for fixing coupler arms 170' relative to the frame when a desired height position is achieved.

Thus, the present invention discloses a turf harvester providing a cutter assembly which permits height, pitch and stroke adjustment with great facility and ease. Further, the structure providing for such adjustments is straightforward in design and may be accomplished without oversized components. For example, blade carrying arms 108 are substantially straight, eliminating any offset component, such as found in some prior art devices. Specifically, blade assembly 100, pivot shaft 110, apertures 146 and 152 are in alignment. Thus, not only is the design simplified, but the stress experienced by the components are easily ascertainable for design purposes. The design further eliminates any unnecessary extension and thus any stress concentration points which would otherwise be introduced by way of welding or attachment by bolting such extensions to the blade carrying arms.

Although preferred embodiments of the invention have been described in the foregoing detailed description and illustrated in the accompanying drawings, it will be understood that the invention is not limited to the embodiments disclosed, but is capable of numerous rearrangements, modifications and substitutions of parts and elements without departing from the spirit of the invention. Accordingly, the present invention is intended to encompass such rearrangements, modifications and substitutions of parts and elements as fall within the spirit and scope of the invention.

I claim:

1. A turf harvester cutter assembly comprising:
    blade carrying arms;
    a blade assembly attached at one end of said blade carrying arms;
    a frame structure;
    a blade elevation means pivotally coupled between said frame structure and said blade carrying arms, said blade elevation means being pivotally attached to said blade carrying arms at first pivot points and pivotally attached to said frame structure at second pivot points;
    means for raising and lowering said blade elevation means to thereby raise and lower said blade carrying arms and said blade assembly;
    reciprocating movement means attached to said blade carrying arms at input points on the opposite side of said first pivot points from said blade assembly for reciprocating said blade carrying arms about said first pivot points to effect cutting of turf encountered by said blade assembly.

2. The cutter assembly according to claim 1 further comprising:
    stroke and blade pitch adjustment means comprising second input points for alternatively receiving said reciprocating movement means, said second input points being intermediate of said first pivot points and said reciprocation input points and being substantially in alignment with said blade assembly, pivot points and reciprocation input points.

3. The cutter assembly according to claim 1 wherein said blade elevation means comprises trailing arms pivotally coupled between said frame structure and said blade carrying arms for selectively raising or lowering said blade assembly.

4. The cutter assembly according to claim 3 wherein said means for raising and lowering comprises:
    a bell crank supported for movement relative to said frame structure and attached to coupler arms between said bell crank and said trailing arms; and
    means for rotating said bell crank to raise or lower said trailing arms thereby raising or lowering said blade assembly.

5. The cutter assembly according to claim 4 wherein said means for rotating said bell crank comprises a hydraulic cylinder connected between said frame structure and said bell crank.

6. The cutter assembly according to claim 1 wherein said blade assembly, first pivot points and reciprocation input points are substantially aligned.

7. A turf harvester cutter assembly comprising:
    parallel balde carrying arms;
    a blade assembly attached adjacent one end of said blade carrying arms;
    a frame structure;
    blade elevation means for supporting said blade carrying arms at a first pivot point and pivotally attached to said frame structure at a further pivot point;
    means for raising and lowering said blade elevation means to thereby raise and lower said blade carrying arms and said blade assembly; and
    reciprocating movement means attached to said blade carrying arms on the opposite side of said first pivot point from said blade assembly for reciprocating said blade carrying arms to effect cutting.

8. The cutter assembly according to claim 7 further comprising a stroke and blade pitch adjustment means comprising:
    means for attaching said reciprocating movement means at a plurality of positions substantially on a line, or extension thereof, from said blade assembly through said first pivot point.

9. The cutter assembly according to claim 7 further comprising:
    said means for raising and lowering further comprising
    means for rotating said blade elevation means to raise or lower said blade assembly; and
    means for setting said blade elevation means at a selected position relative to said frame means.

10. The cutter assembly according to claim 7 further comprising:
    said means for raising and lowering further comprising
    means for rotating said blade elevation means to raise or lower said blade assembly; and
    means for setting said blade elevation means relative to said frame means.

11. A turf harvester cutter assembly comprising:
    blade carrying arms;

a blade assembly attached at one end of said blade carrying arms;

a frame;

blade elevation means pivotally coupled between said frame and said blade carrying arms, said blade elevation means being pivotally attached to said blade carrying arms at a first pivot point and pivotally attached to said frame at a second pivot point;

means for raising and lowering said blade elevation means to thereby raise and lower said blade carrying arms and said blade assembly; and reciprocating movement means attached to said blade carrying arms at input points spaced from said blade assembly for reciprocating said blade carrying arms about said first pivot point to effect cutting of turf engaged by said blade assembly.

12. The cutter assembly according to claim 11 further comprising:

stroke and blade pitch adjustment means comprising second input points for alternatively receiving said reciprocating movement means, said second input points being intermediate of said first pivot point and said reciprocation input points and being substantially in alignment with said blade assembly, first pivot point and reciprocation input points.

13. The cutter assembly according to claim 11 wherein said blade elevation means comprises trailing arms pivotally coupled between said frame structure and said blade carrying arms for selectively raising or lowering said blade assembly.

14. The cutter assembly according to claim 13 wherein said blade hight adjustment comprises:

a bell crank supported for movement relative to said frame and attached to coupler arms between said bell crank and said trailing arms; and means for rotating said bell crank to raise or lower said trailing arms thereby raising or lowering said blade assembly.

15. The cutter assembly according to claim 14 wherein said means for rotating said bell crank comprises a hydraulic cylinder connected between said frame and said bell crank.

* * * * *